US008463337B2

(12) United States Patent
Choi et al.

(10) Patent No.: US 8,463,337 B2
(45) Date of Patent: Jun. 11, 2013

(54) SLIDING MODULE WITH SCRATCH PREVENTION DEVICE

(75) Inventors: Jong-Hwan Choi, Seoul (KR); Jae-Il Seo, Gyeongsangbuk-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 456 days.

(21) Appl. No.: 12/562,176

(22) Filed: Sep. 18, 2009

(65) Prior Publication Data

US 2010/0080495 A1    Apr. 1, 2010

(30) Foreign Application Priority Data

Oct. 1, 2008    (KR) .................. 10-2008-0096621

(51) Int. Cl.
*H04M 1/00*    (2006.01)
(52) U.S. Cl.
USPC ............. 455/575.4; 455/575.1; 455/550.1

(58) Field of Classification Search
USPC ................. 455/550.1, 575.1, 575.4
See application file for complete search history.

(56) References Cited

U.S. PATENT DOCUMENTS

2007/0091555 A1*    4/2007    Lee ............................ 361/683

* cited by examiner

*Primary Examiner* — Fayyaz Alam
(74) *Attorney, Agent, or Firm* — Cha & Reiter, LLC

(57) ABSTRACT

A sliding module with a scratch prevention device for a sliding-type portable terminal, including a body housing, a sliding housing, a main member provided in the body housing, a sliding member provided in the sliding housing and coupled such that the sliding member may slidingly move in the main body, a guide member provided on each of both ends of the main member, and a guide rail provided on each of both ends of the sliding member and slidingly movably coupled to the guide member so that the guide rail may be guided. The sliding module includes a scratch prevention portion provided on a part where the guide member and the guide rail contact each other, and at least one auxiliary scratch prevention portions provided crossing each other on a part where the guide member and the sliding housing contact each other.

20 Claims, 4 Drawing Sheets

SLIDING MODULE WITH SCRATCH PREVENTION DEVICE

CLAIM OF PRIORITY

This application claims the benefit of the earlier filing date, under 35 U.S.C. §119(a), to that Korean Patent Application filed in the Korean Intellectual Property Office on Oct. 1, 2008 and assigned Serial No. 10-2008-0096621, the entire disclosure of which is hereby incorporated by reference.

BACKGROUND OF THE INVENTION

1. Field of the Invention

The present invention relates to a sliding module with a scratch prevention device, in which a scratch prevention portion is formed in the sliding module to prevent scratch and de-coating occurring due to a sliding movement.

2. Description of the Related Art

A 'portable terminal', also referred to as a portable communication device or wireless communication device, refers to a device by which a user can wirelessly communicate with another party while carrying it. Portable terminals may be classified into several types according to their appearance. For example, portable terminals may be of a bar-type, a flip-type and a folder-type. The bar-type terminal has a single housing shaped like a bar. The flip-type terminal has a flip pivotally mounted to a bar-shaped housing by a hinge device. The folder-type terminal has a folder coupled to a single bar-shaped housing by a hinge device in such a manner that the folder can be rotated to fold to or unfold from the housing.

Portable terminals may also be classified into rotation-type terminals and sliding-type terminals according to the manner of opening and closing the terminal. In the rotation-type terminal, two housings are coupled to each other in such a manner that one housing rotates to open or close relative to the other housing, while facing each other. In the sliding-type terminal, two housings are coupled to each other in such a manner that one housing slides in the longitudinal direction to open or close relative to the other housing, while facing each other. These variously classified conventional portable terminals can be readily understood by those of ordinary skill in the art.

Referring to FIGS. 1 to 3, a sliding module 2 for a sliding-type portable terminal 1 includes a body housing (not shown), a sliding housing 3 slidingly moving with respect to the body housing, a main member 2a provided in the body housing, a sliding member 2b provided in the sliding housing 3 and movably coupled to the main member 2a, and an elastic member 4 providing elastic force to slidably move the sliding member 2b.

A guide member 5 is provided on each of both ends of the main member 2a, and a guide rail 6 is formed on each of both ends of the sliding member 2b to guide sliding movement on the guide member 5.

However, in the conventional sliding module for a sliding-type portable terminal, when the sliding housing is slidingly moved, the guide rail also slidingly moves on the guide member. At this point, a scratch may occur due to a friction caused by contact between the guide rail and the guide member, and the exterior of the guide rail and the guide member may be de-coated.

In addition, the guide member may swing or move freely when the guide rail slidingly moves, worsening the scratch and de-coating of the guide rail.

The de-coating of the guide rail and the guide member may shorten the operational lifetime of the sliding module and decrease reliability of the product.

Therefore, the sliding module needs an apparatus for preventing the scratch and de-coating which may occur during its sliding movement.

SUMMARY OF THE INVENTION

Accordingly, an aspect of the present invention provides a sliding module with a scratch prevention device, in which a scratch prevention portion is formed in the sliding module to prevent scratch and de-coating from occurring due to a sliding movement, thereby improving the operational lifetime and reliability of the product.

Another aspect of the present invention provides a sliding module with a scratch prevention device, in which at least one auxiliary scratch prevention portion is formed to prevent swinging from occurring during a sliding movement of the sliding module. Thereby preventing scratch and de-coating of the product.

According to one aspect of the present invention, a sliding module with a scratch prevention device for a sliding-type portable terminal includes a body housing, a sliding housing, a main member provided in the body housing, a sliding member provided in the sliding housing and coupled such that the sliding member may slidingly move in the main body, a guide member provided on each of both ends of the main member, and a guide rail provided on each of both ends of the sliding member and slidingly movably coupled to the guide member so that the guide rail may be guided. The sliding module includes a scratch prevention portion provided on a part where the guide member and the guide rail contact each other, and at least one auxiliary scratch prevention portion provided crossing each other on a part where the guide member and the sliding housing contact each other.

In one aspect, the scratch prevention portion and the auxiliary scratch prevention portions are formed of scratch prevention protrusions protruding to a predetermined height.

In one aspect, the scratch prevention portion is provided in a guide groove formed on the guide member.

In one aspect, the auxiliary scratch prevention portions include first and second auxiliary scratch prevention portions, in which the first auxiliary scratch prevention portion is provided on the outskirt of the guide member, and the second auxiliary scratch prevention portion is provided in a mounting groove formed on the sliding housing.

In one aspect, the scratch prevention portion and the auxiliary scratch prevention portions are formed in a shape of a hemisphere.

In one aspect, a gap between the guide member and the guide rail at a part where the guide member and the guide rail contact each other is defined as 0.2 mm by the scratch prevention portion.

In one aspect, a gap between the guide member and the sliding housing at a part where the guide member and the sliding housing contact each other is 0.2 mm by the auxiliary scratch prevention portions.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
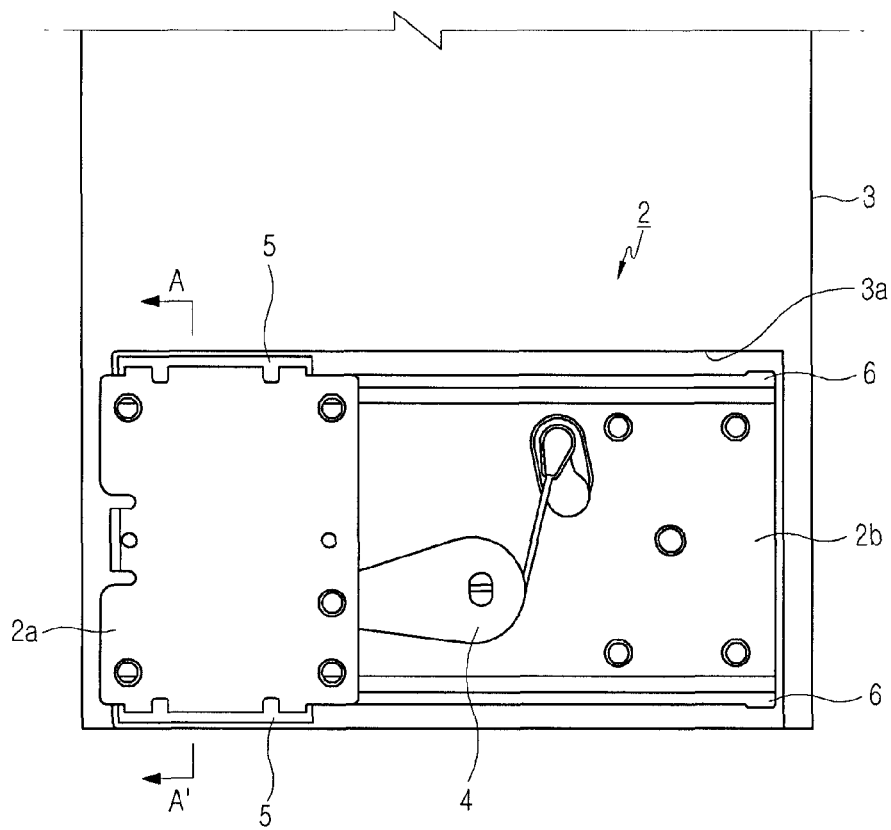
FIG. 1 is a plane view illustrating a structure of a sliding module for a sliding-type portable terminal according to the prior art.
Figure 2:
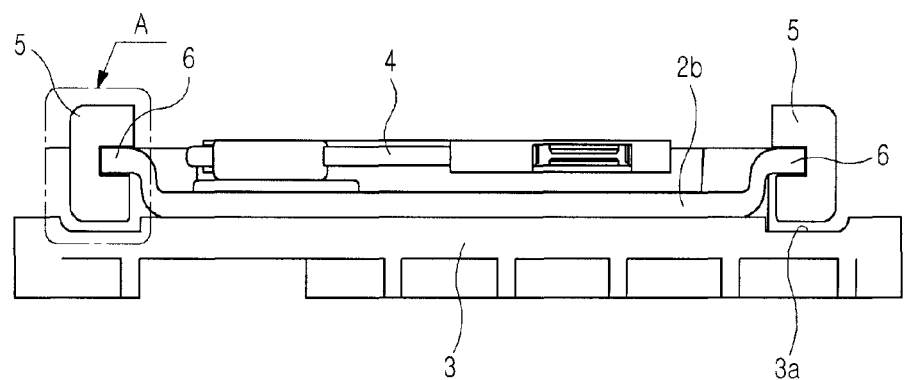
FIG. 2 is a cross-sectional view taken along a line A-A' of FIG. 1.
Figure 3:
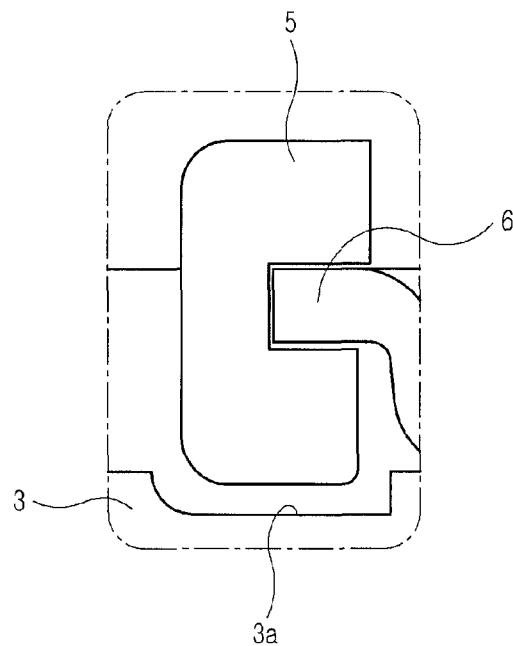
FIG. 3 is an enlarged cross-sectional view of part A in FIG. 2.
Figure 4:
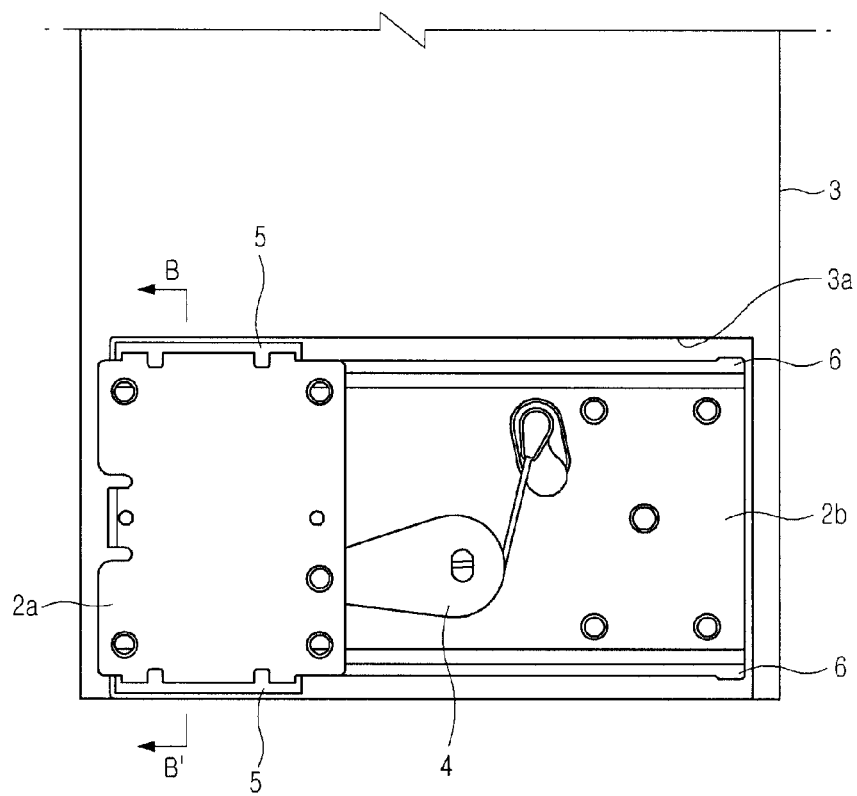
FIG. 4 is a plane view illustrating a structure of a sliding module for a sliding-type portable terminal according to an exemplary embodiment of the present invention.
Figure 5:
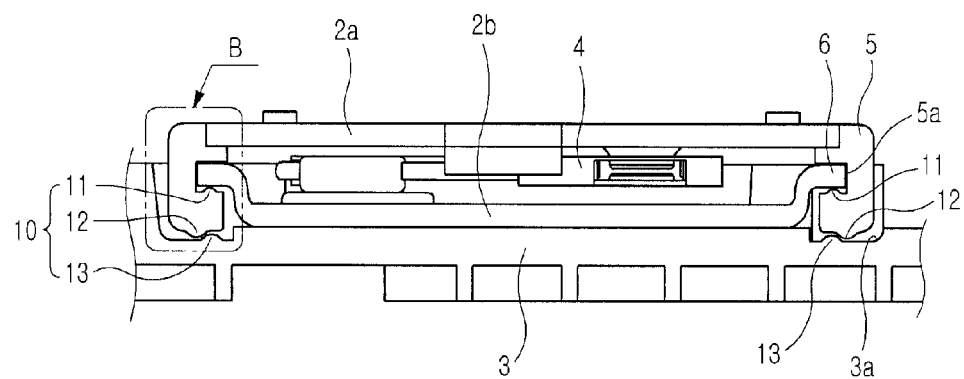
FIG. 5 is a cross-sectional view taken along a line B-B' of FIG. 4.
Figure 6:
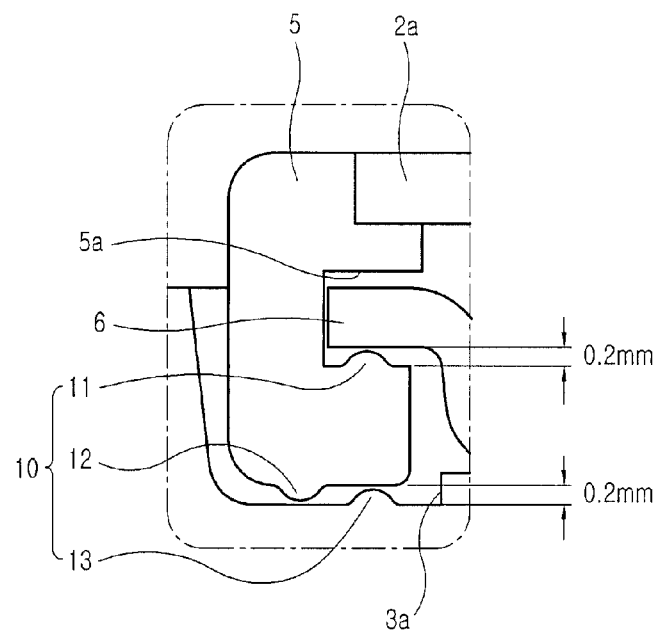
FIG. 6 is an enlarged cross-sectional view of a part B in FIG. 5.

Referring to FIGS. 4 to 6, a sliding module 2 with a scratch prevention device 10 includes a scratch prevention portion 11 and at least one auxiliary scratch prevention portions 12 and 13.

The scratch prevention portion 11 is provided on a part where a guide member 5 and a guide rail 6 contact each other so as to prevent scratching and de-coating of the guide member 5 and the guide rail 6 in the sliding module 2.

The auxiliary scratch prevention portions 12 and 13 are provided crossing each other on a part where the guide member 5 and the sliding housing 3 contact each other so as to help prevent scratching and de-coating of the guide member 5 in the sliding module 2 and the sliding housing 3 by preventing swinging of the guide member 5 and the guide rail 6.

The scratch prevention portion 11 and the auxiliary scratch prevention portions 12 and 13 formed scratch prevention protrusions protruding to a predetermined height.

The scratch prevention portion 11 is provided in a guide groove 5a formed on the guide member 5 so that it may contact the guide rail 6.

The auxiliary scratch prevention portions 12 and 13 include first and second auxiliary scratch prevention portions.

The first auxiliary scratch prevention portion 12 is provided on the outskirts (outer edge or surface) of the guide member 5 so that it may contact a mounting groove 3a on the sliding housing 3, and the second auxiliary scratch prevention portion 13 is provided in the mounting groove 3a formed on the sliding housing 3 so that it may contact the guide member 5.

The scratch prevention portion 11 and the first and second auxiliary scratch prevention portions 12 and 13 are formed in a shape of a hemisphere.

A gap between the guide member 5 and the guide rail 6 at a part where the guide member 5 and the guide rail 6 contact each other is defined as 0.2 mm by the scratch prevention portion 11.

Herein, the gap between the guide member 5 and the guide rail 6 at the part where the guide member 5 and the guide rail 6 contact each other is not limited to 0.2 mm, but can be defined below or above 0.2 mm.

A gap between the guide member 5 and the sliding housing 3 at a part where the guide member 5 and the sliding housing 3 contact each other is also defined as 0.2 mm by the first and second scratch prevention portions 12 and 13.

Similarly, the gap between the guide member 5 and the sliding housing 3 at the part where the guide member 5 and the sliding housing 3 contact each other is not limited to 0.2 mm, but can be defined below or above 0.2 mm.

With reference to FIGS. 4 to 6, a detailed description will now be made of an operation of the sliding module with a scratch prevention device according to an exemplary embodiment of the present invention.

Referring to FIGS. 4 to 6, a sliding module 2 with a scratch prevention device 10 includes a scratch prevention portion 11 and first and second auxiliary scratch prevention portions 12 and 13.

The scratch prevention portion 11 is formed on a guide member 5 in the sliding module 2, and provided in a guide groove 5a formed on the guide member 5. Scratch prevention portion 11 is hemispheric shaped to create a minimum contact area between the glide member and the sliding module 2.

A guide rail 6 in the sliding module 2 is coupled in such a manner that it can slidingly move in the guide groove 5a.

As illustrated in FIGS. 5 and 6, the scratch prevention portion 11 and the guide rail 6 contact each other, and a gap between the guide rail 6 and the guide groove 5a is defined as 0.2 mm by the scratch prevention portion 11.

Herein, the gap between the guide rail 6 and the guide groove 5a is not limited to 0.2 mm, but can be defined below or above 0.2 mm.

In this state, when the sliding module 2 is mounted in the mounting groove 3a formed on the sliding housing 3, a first auxiliary scratch prevention portion 12 formed on the outskirts (outer edge) of the guide member 5 contacts the inside of the mounting groove 3a, and a second auxiliary scratch prevention portion 13 formed in the mounting groove 3a contacts the outskirts of the guide member 5.

Similarly, as illustrated in FIGS. 5 and 6, the first and second auxiliary scratch prevention portions 12 and 13 are provided crossing each other, and a gap between the mounting groove 3a and the guide member 5 is defined as 0.2 mm by the first and second auxiliary scratch prevention portions 12 and 13.

Herein, the gap between the guide member 5 and the mounting groove 3a is not limited to 0.2 mm, but can be defined below or above 0.2 mm.

In this state, when the sliding housing 3 is slidingly moved, the guide rail 6 also slidingly moves together in the guide groove 5a. For example, the guide rail 6 slidingly moves with a gap of 0.2 mm by the scratch prevention portion 11 formed in the guide groove 5a.

As is apparent from the foregoing description, the guide member 5 and the guide rail 6 can prevent scratching and de-coating by means of the scratch prevention portion 11.

In addition, the first and second auxiliary scratch prevention portions 12 and 13 can prevent swinging from occurring while the guide rail 6 slidingly moves in the guide member 5, thereby further preventing possible scratching and de-coating.

While the sliding module with a scratch prevention device according to the present invention has been shown and described with reference to certain exemplary embodiments and annexed drawings, it will be understood by those skilled in the art that various changes in form and details may be made therein without departing from the spirit and scope of the invention as defined by the appended claims and their equivalents.

What is claimed is:

1. A sliding module with a scratch prevention device for a sliding-type portable terminal, including: a body housing having a substantially planar portion, a sliding housing, a main member provided in the body housing, a sliding member provided in the sliding housing and coupled such that the sliding member selectively moves in the main body in a predetermined direction substantially parallel to the substantially planar portion, a guide member provided on each of both ends of the main member, and a guide rail provided on each of both ends of the sliding member and slidingly movably coupled to the guide member so that the guide rail is guided selectively, the sliding module comprising:

a first scratch prevention portion comprising a first protrusion provided on a part where the guide member and the guide rail contact each other, said first protrusion extending perpendicular to the substantially planar portion and perpendicular to the predetermined direction, and having a height which establishes a space between said guide member and said guide rail; and at least one auxiliary scratch prevention portion comprising two elongate protrusions, with each elongate protrusion extending perpendicular to the substantially planar portion and perpendicular to the predetermined direction, and provided in a parallel arrangement so as to oppose one another in an off-set manner on a respective one of the guide member and the sliding housing where the guide member and the sliding housing contact each other.

2. The sliding module with a scratch prevention device of claim 1, wherein the first scratch prevention portion and the at least one auxiliary scratch prevention portion form scratch prevention protrusions protruding at a substantially identical predetermined height.

3. The sliding module with a scratch prevention device of claim 1, wherein the first scratch prevention portion is disposed in a guide groove formed on the guide member.

4. The sliding module with a scratch prevention device of claim 1, where the two elongate protrusions include a first elongate protrusion and a second elongate protrusion;

wherein the first elongate protrusion is disposed on the outer edge of the guide member, and the second elongate protrusion is disposed in a mounting groove formed on the sliding housing.

5. The sliding module with a scratch prevention device of claim 1, wherein each of the first scratch prevention portion and the at least one auxiliary scratch prevention portion has a hemispherical cross-section.

6. The sliding module with a scratch prevention device of claim 1, wherein a gap between the guide member and the guide rail at a part where the guide member and the guide rail contact each other is defined as 0.2 mm from the first scratch prevention portion.

7. The sliding module with a scratch prevention device of claim 1, wherein a gap between the guide member and the sliding housing at a part where the guide member and the sliding housing contact each other is 0.2 mm from the at least one auxiliary scratch prevention portion.

8. A glide mechanism for a housing of a sliding-type terminal, comprising;

a glide body housing having a substantially planar portion, a glide groove within said glide body housing, said glide groove housing a guide rail including a first protrusion extending a length of said guide rail for supporting an end of a slidable member which slides in a predetermined direction substantially parallel to the substantially planar portion, said first protrusion extending perpendicular to the substantially planar portion and perpendicular to the predetermined direction and having a height which establishes a space between said glide groove and said guide rail; and at least one auxiliary scratch prevention protrusion extending from said glide body housing, said at least one auxiliary scratch prevention protrusion extending perpendicular to the substantially planar portion and perpendicular to the predetermined direction and having a height which establishes a space between said glide body housing and said housing of the sliding-type terminal.

9. The glide mechanism of claim 8, wherein said first protrusion and said at least one auxiliary scratch prevention protrusion have a height on the order of 0.2 mm.

10. The glide mechanism of claim 8, wherein each of said first protrusion and said at least one auxiliary scratch prevention protrusion has a hemispherical cross-section.

11. The glide mechanism of claim 8, wherein said first protrusion extends in a first direction and said at least one auxiliary scratch prevention protrusion extends in a second direction opposite to the first direction.

12. The glide mechanism of claim 11, wherein said first protrusion and said at least one auxiliary scratch prevention protrusion are offset from each other.

13. The glide mechanism of claim 8, wherein said at least one auxiliary scratch prevention protrusion comprises two elongate protrusions provided in a parallel arrangement so as to oppose one another on a respective one of the glide body housing and the housing of the sliding-type terminal at a point where the glide body housing and the housing of the sliding-type terminal connect to each other.

14. A glide mechanism for a housing of a sliding-type terminal, comprising;

a glide body housing having a substantially planar portion;

a glide groove within said glide body housing, said glide groove housing a guide rail including a first protrusion extending a length of said guide rail for supporting an end of a slidable member which slides in a predetermined direction substantially parallel to the substantially planar portion, said first protrusion extending perpendicular to the substantially planar portion and having a height which establishes a space between said glide groove and said guide rail; and second and third protrusions extending from said glide body housing, each of said second and third protrusions extending perpendicular to the substantially planar portion and having a height which establishes a space between said glide body housing and said housing of the sliding-type terminal.

15. The glide mechanism of claim 14, wherein each of said first, second, and third protrusions has a height on the order of 0.2 mm.

16. The glide mechanism of claim 14, wherein each of said first, second, and third protrusions has a hemispherical cross-section.

17. The glide mechanism of claim 14, wherein said first protrusion extends in a first direction and each of said second and third protrusions extends in a second direction opposite to the first direction.

18. The glide mechanism of claim 17, wherein said first protrusion is offset from each of the second and third protrusions.

19. The glide mechanism of claim 14, wherein each of the second and third protrusions comprises an elongate protrusion provided in a parallel arrangement so as to oppose one another on a respective one of the glide body housing and the housing of the sliding-type terminal at a point where the glide body housing and the housing of the sliding-type terminal connect to each other.

20. The sliding module of claim 1, wherein said first protrusion extends in a first direction and said at least one auxiliary scratch prevention protrusion extends in a second direction opposite to the first direction.

\* \* \* \* \*